(12) United States Patent
Xie et al.

(10) Patent No.: US 9,678,607 B2
(45) Date of Patent: Jun. 13, 2017

(54) TOUCH PANEL AND A MANUFACTURING METHOD THEREOF

(71) Applicant: TPK Touch Solutions (Xiamen) Inc., Xiamen (CN)

(72) Inventors: Yanjun Xie, Wuhan (CN); Silu Yu, Jiujiang (CN); Enshi Shi, Xiamen (CN); Yau-Chen Jiang, Hsinchu (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 317 days.

(21) Appl. No.: 13/733,907

(22) Filed: Jan. 4, 2013

(65) Prior Publication Data

US 2014/0190807 A1   Jul. 10, 2014
US 2017/0098515 A9   Apr. 6, 2017

(30) Foreign Application Priority Data

Jan. 6, 2012 (CN) .......................... 2012 1 0009311

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04112* (2013.01); *Y10T 29/49105* (2015.01)

(58) Field of Classification Search
CPC ................................ G06F 3/044; G06F 3/041
See application file for complete search history.

(56) References Cited

U.S. PATENT DOCUMENTS

| 2011/0006301 A1* | 1/2011 | Yamazaki | ........... H01L 27/1225 257/43 |
| 2011/0063240 A1* | 3/2011 | Tanabe | .................... G06F 3/044 345/173 |
| 2013/0122251 A1* | 5/2013 | Matsumoto et al. | ......... 428/141 |
| 2013/0256008 A1* | 10/2013 | Zeng et al. | .................... 174/257 |

FOREIGN PATENT DOCUMENTS

| CN | 101923416 | 12/2010 |
| CN | 101968704 | 2/2011 |
| JP | 10337524 | 12/1998 |
| TW | 201020893 | 6/2010 |

* cited by examiner

*Primary Examiner* — Renee Luebke
*Assistant Examiner* — Ahmed Saeed
(74) *Attorney, Agent, or Firm* — Cooper Legal Group, LLC

(57) ABSTRACT

The present disclosure relates to a touch technology, and more particularly, to a touch panel and a manufacturing method the same. A touch panel is provided, comprising an inductive electrode layer and a patterned protective layer covering the inductive electrode layer; wherein formative pattern of the patterned protective layer is identical to that of the inductive electrode layer. The present disclosure also provides a manufacturing method for touch panels. A touch panel and a manufacturing method the same are provided in the present disclosure, in which the patterned protective layer is used for covering the inductive electrode layer to isolate the inductive electrode layer from oxygen and overcome the influence of oxygen on the diamond resistance changes of conductive materials under the condition of high-temperature baking, thereby enhancing the accuracy of touch positions recognized by touch panel.

19 Claims, 9 Drawing Sheets

TOUCH PANEL AND A MANUFACTURING METHOD THEREOF

This application claims the benefit of Chinese application No. 201210009311.5, filed on Jan. 6, 2012.

BACKGROUND

Technical Field

The present disclosure relates to a touch technology. More particularly, the present disclosure relates to a touch panel and a manufacturing method thereof.

Description of the Related Art

A touch panel is typically designed by setting a plurality of transparent electrodes that intersect each other and are insulated mutually on surface of a substrate, wherein the transparent electrodes are connected with a controller via a peripheral circuit. When a touch object approaches or contacts a touch panel at a particular touch position, capacitive changes between the transparent electrodes are produced on the touch position, and signals of the capacitive changes are transmitted to the controller via a peripheral circuit for calculation, allowing coordinates of the touch positions to be determined.

However, the transparent electrodes (such as X axial conductive units and Y axial conductive units) are generally manufactured using a photo-etching technology and further need to undergo a process of high-temperature baking. In the baking process, materials of transparent conductive films used for transparent electrodes are baked under aerobic circumstances, which causes rise in diamond resistance of the transparent electrodes and makes practical value of wired resistance of transparent electrodes much larger than the theoretical value, thereby affecting the systematic and correct recognition of the touched X axial and Y axial positions on the touch panel.

SUMMARY OF THE INVENTION

The present disclosure provides a touch panel and a manufacturing method thereof, wherein touch panel of the present disclosure provides a patterned protective layer to cover inductive electrode layer. In a baking process, the patterned protective layer is used for isolating the inductive electrode layer from oxygen to overcome the influence of oxygen over diamond resistance changes of conductive materials under the condition of high-temperature baking, thereby enhancing accuracy of touch positions recognized by the touch panel.

A touch panel provided in the present disclosure comprises an inductive electrode layer, and a patterned protective layer covering the inductive electrode layer, wherein formative pattern of the patterned protective layer is identical to that of the inductive electrode layer.

The touch panel, provided in accordance with the present disclosure, further comprises a substrate having a touch region and a peripheral region surrounding the touch region on which the inductive electrode layer is disposed; a plurality of lapping endpoints distributed on the edge of the touch region and electrically connected with the inductive electrode layer; a peripheral circuit distributed on the peripheral region of the substrate and electrically connected with the lapping endpoints.

The touch panel is provided in accordance with the present disclosure, wherein the patterned protective layer further covers the peripheral circuit and is identical to the formative patterns of the peripheral circuit.

The present disclosure provides a manufacturing method for touch panels, which includes the step of baking an inductive electrode layer and a patterned protective layer covering the inductive electrode layer simultaneously, wherein the formative pattern of the patterned protective layer is identical to that of the inductive electrode layer.

In the manufacturing method for touch panels, provided in accordance with the present disclosure, the step of baking the inductive electrode layer and the patterned protective layer can be synchronously conducted at high temperature.

In the manufacturing method for touch panels, provided in accordance with the present disclosure, prior to the step of baking the inductive electrode layer and the patterned protective layer synchronously, the steps of coating an inductive layer on the touch region of a substrate; coating a protective layer on the inductive layer; patterning the protective layer to form the patterned protective layer, and patterning the inductive layer to form the inductive electrode layer, are performed.

BRIEF DESCRIPTION OF THE DRAWINGS

For those skilled in the art, numerous embodiments and drawings described below are for illustration purpose only and not to limit the scope of the present disclosure in any manner.

DETAILED DESCRIPTION OF THE EMBODIMENTS

To make the present disclosure more comprehensible to a person ordinarily skilled in the art, following disclosure lists several preferred embodiments coupled with the attached drawings for detailed description of the constituent content of the present disclosure and the efficiency to be attained.

Figures 1A, 1B:
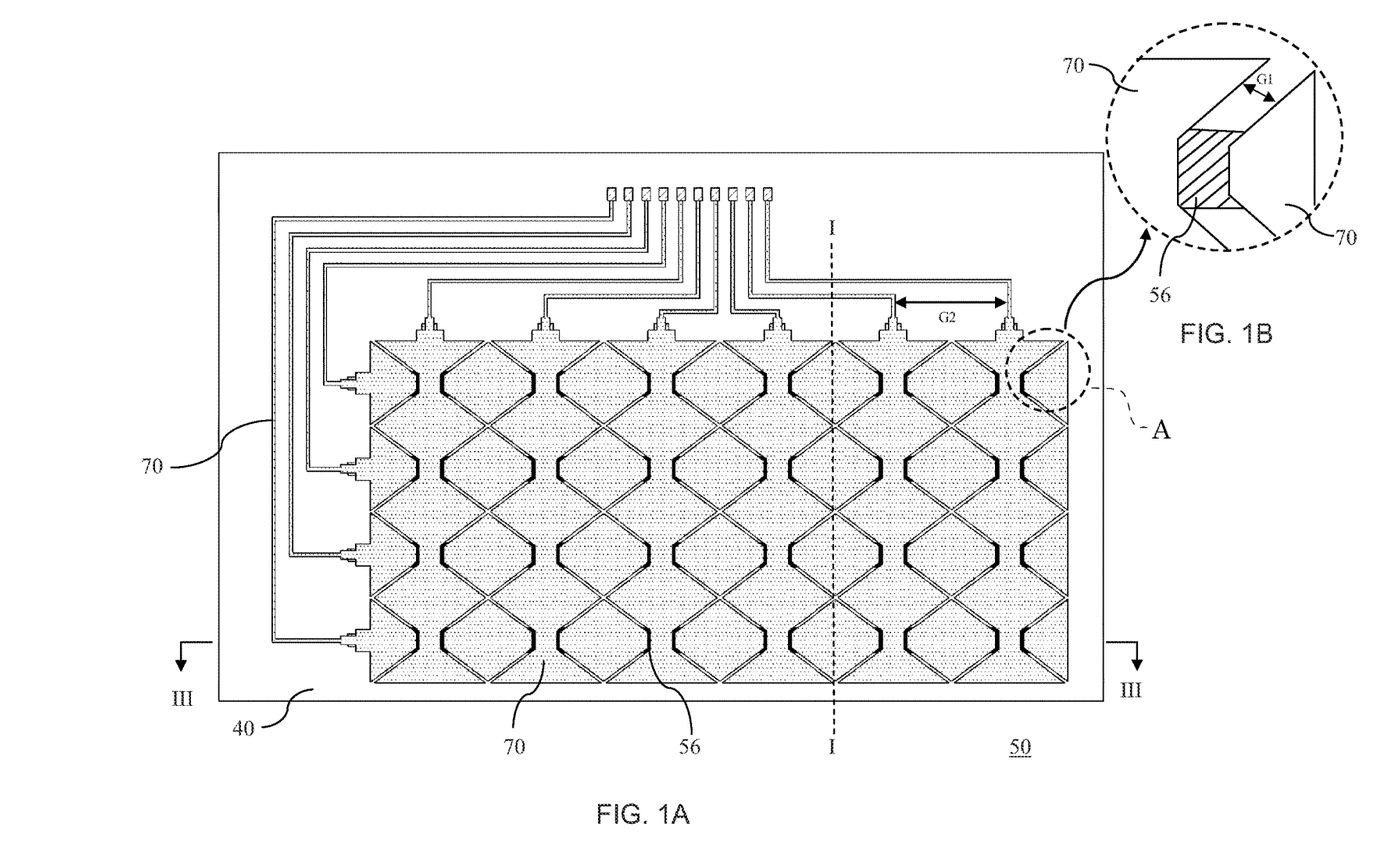
FIG. 1A is a planar schematic diagram of a touch panel in accordance with the present disclosure.
FIG. 1B is an enlarged diagram of "A" portion in FIG. 1A.
Figures 2A, 2B:
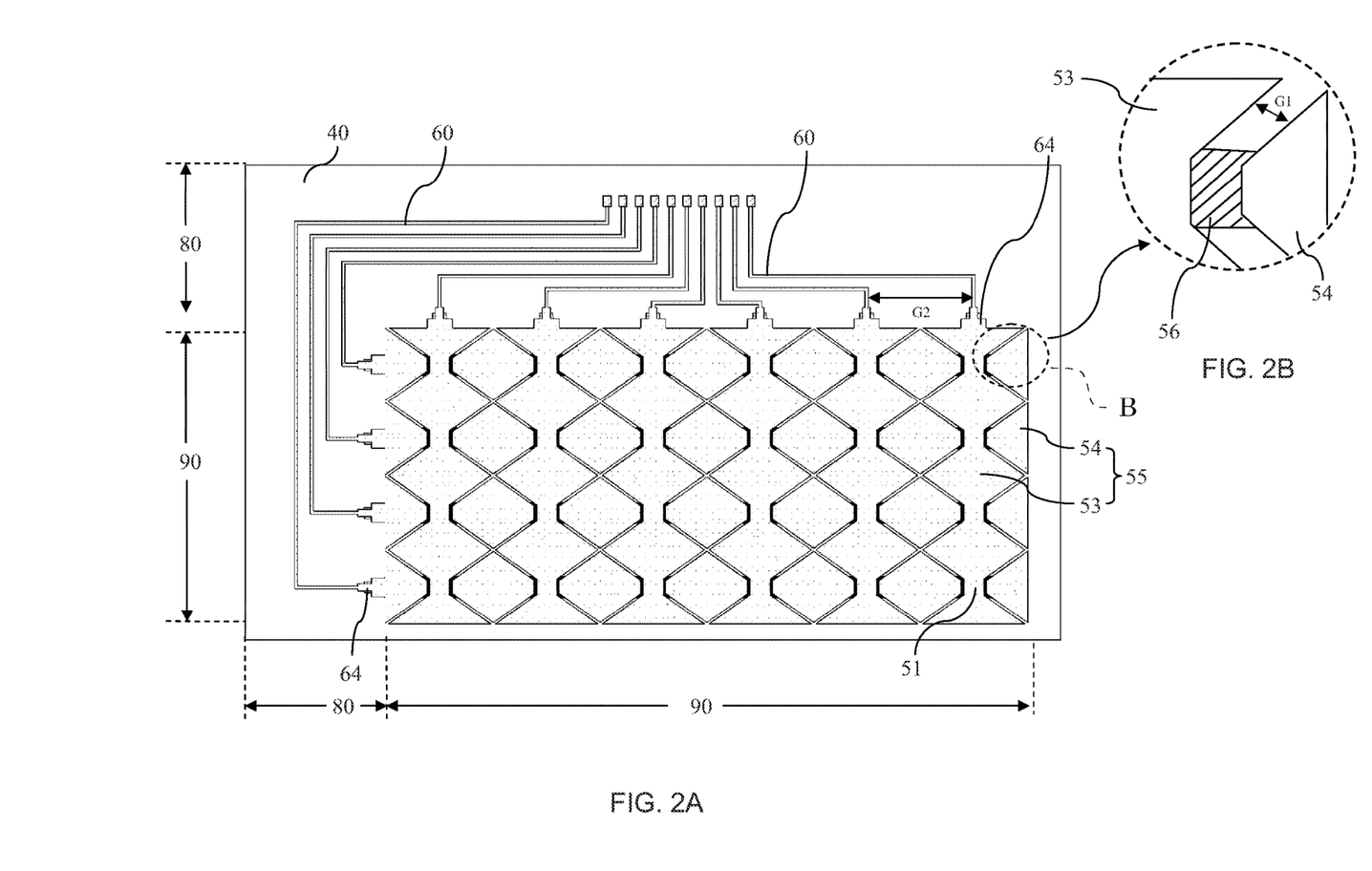
FIG. 2A is a planar schematic diagram of the touch panel without a protective layer in FIG. 1A.
FIG. 2B is an enlarged diagram of "B" portion in FIG. 2A.
Figure 3:
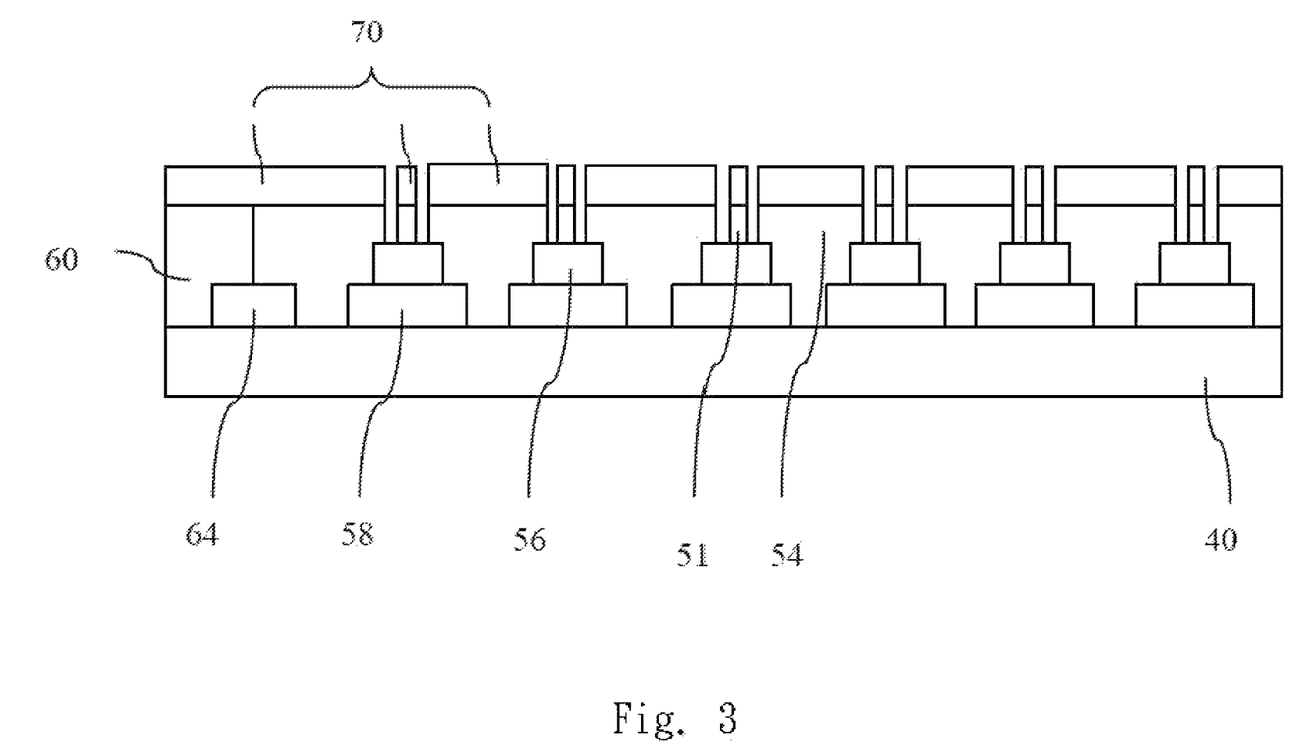
FIG. 3 is a cross-sectional schematic diagram of the touch panel on a cross-sectional line III-III in FIG. 1A.
Figure 9:
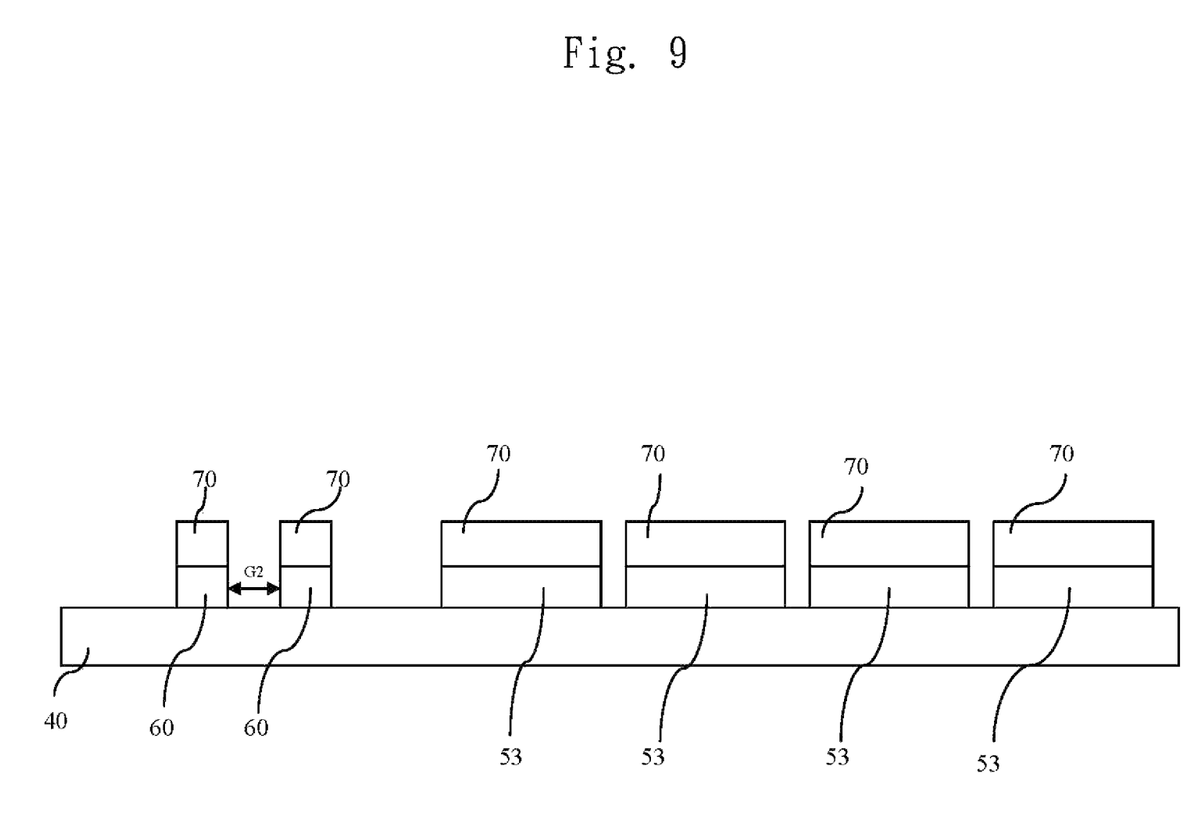
FIG. 9 is a cross-sectional schematic diagram of the touch panel on a cross-sectional line I-I in FIG. 1A.

Referring to FIG. 1A, FIG. 2A and FIG. 3, FIG. 1A is a planar schematic diagram of a touch panel in accordance with the present disclosure, FIG. 2A is a planar schematic diagram of the touch panel without a protective layer in FIG. 1A, and FIG. 3 is a cross-sectional schematic diagram of the touch panel on a cross-sectional line III-III in FIG. 1A. In addition, FIG. 9 is a cross-sectional schematic diagram of the touch panel on a cross-sectional line I-I in FIG. 1A.

The touch panel 50 includes an inductive electrode layer 55 and a patterned protective layer 70, wherein the patterned protective layer 70 covers the inductive electrode layer 55, and wherein formative pattern of the patterned protective layer 70 is identical to that of the inductive electrode layer 55.

The inductive electrode layer 55 includes a plurality of first conductive units 54 distributed along a first axis and a plurality of first conductive lines 58 connected with the first conductive units 54, and a plurality of second conductive units 53 distributed along a second axis and a plurality of second conductive lines 51 (as shown in FIG. 3) connected with the second conductive units 53. A plurality of insulating blocks 56 are disposed on the touch panel 50, wherein each insulating block is set between the corresponding first conductive line 58 and second conductive line 51 to make the first conductive unit 54 and the second conductive unit 53 electrically insulated from each other. Also, there is a gap G1 (i.e., the first gap) formed between the adjacent first conductive unit 54 and the second conductive unit 53, as shown in FIG. 2B that shows the enlarged part "B" of FIG. 2A. The insulating blocks 56 are made of transparent insulating materials.

The patterned protective layer 70 covers the first conductive units 54, the second conductive units 53, and the second conductive lines 51. Formative pattern of the patterned protective layer 70 is identical to that of the first conductive unit 54, the second conductive unit 53, and the second conductive line 51, as shown in FIGS. 1A, 1B, 3 and 9. Therefore, the gap G1, as shown in FIG. 1B that shows the enlarged part "A" of FIG. 1A, is exposed from the protective layer 70. The patterned protective layer 70 also covers the first conductive line 58 and the insulating blocks 56 that are exposed outside, thereby protecting these components from being subjected to the subsequent baking in a high-temperature manufacturing process.

The touch panel 50 further includes a substrate 40 having a touch region 90 and a peripheral region 80 surrounding the touch region 90, wherein the inductive electrode layer 55 is laid on the touch region 90 of the substrate 40 for inducing touch actions of a user and generating the inductive signals. The substrate 40 can be transparent glass substrate or plastic substrate, wherein materials of the said plastic substrate can include, but not limited to PET, PC, PE and PMMA.

The touch panel 50 further includes a plurality of lapping endpoints 64 and a plurality of peripheral circuits 60, wherein the lapping endpoints 64 are distributed at an edge of the touch region 90 and are electrically connected with the inductive electrode layer 55. The peripheral circuits 60 are distributed at the peripheral region 80 of the substrate 40 and electrically connected with the lapping endpoints 64. As shown in FIG. 2A, there is a gap G2 (i.e., the second gap) formed between the adjacent peripheral circuits 60. The peripheral circuits 60 are electrically connected with the inductive electrode layer 55 via the lapping endpoints 64 and are used to transmit inductive signals of the inductive electrode layer 55 to the controller (not shown) via the lapping endpoints 64 for calculation, thereby helping determine coordinates of touch positions on the touch panel 50.

In an embodiment, the patterned protective layer 70 can cover the peripheral circuits 60 and is also identical to the peripheral circuits 60 as regards their respective formative patterns. Therefore, the gap G2, as shown in FIG. 1A, is exposed from the protective layer 70. The peripheral circuits 60 and the lapping endpoints 64 are made of metallic or transparent conductive materials, while the patterned protective layer 70 is made of transparent insulating materials.

The peripheral circuits 60 are electrically connected with the first conductive unit 54 and the second conductive unit 53 through the lapping endpoints 64 disposed on different axes. This allows transmission of capacitance changes, caused by the touches on the first conductive unit 54 and the second conductive unit 53, to the controller (not shown) via the peripheral circuit 60 for calculation, thereby determining the coordinates of touch positions on the touch panel 50.

In the above disclosed structure of the touch panel 50, the first conductive units 54, the second conductive units 53, and the second conductive lines 51, are made of transparent conductive materials, whereas the first conductive lines 58 are made of metallic or transparent conductive materials.

Figure 4:
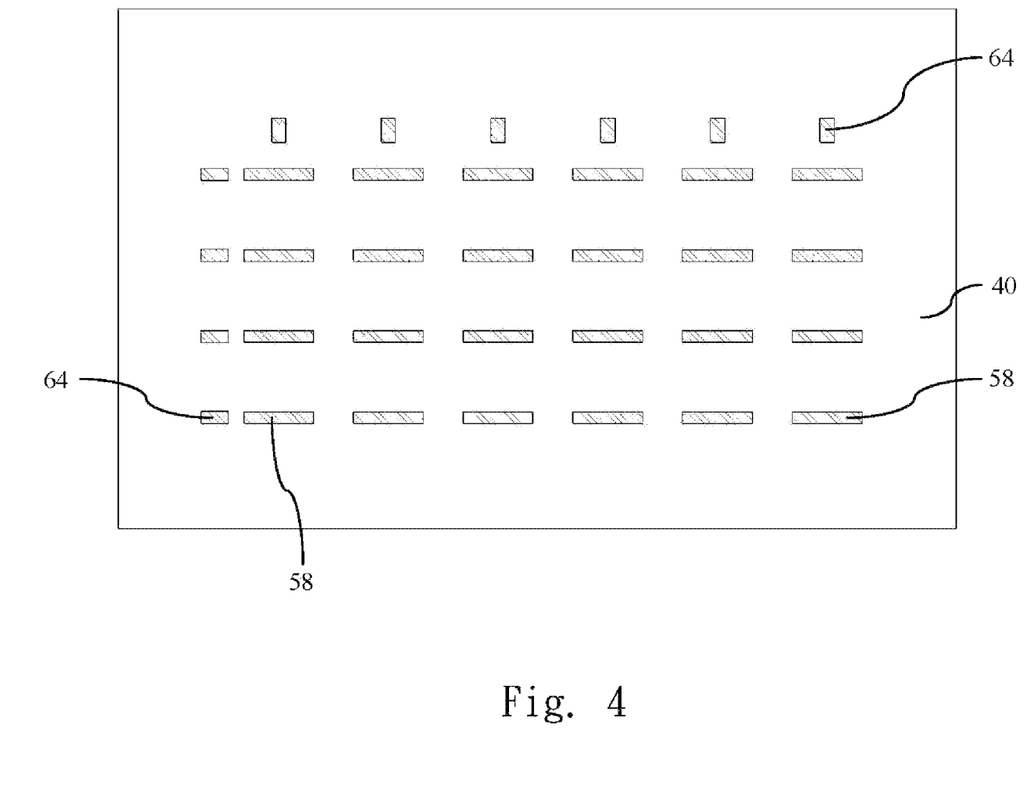
FIG. 4 is a schematic diagram of a first manufacturing process of a touch panel in accordance with the present disclosure.

A manufacturing method of a touch panel 50 includes the step of baking an inductive electrode layer 55 and a patterned protective layer 70 that covers the inductive electrode layer 55, wherein the baking step bakes the inductive electrode layer 55 and the patterned protective layer 70 at a high temperature. Detailed steps of the proposed method are illustrated as following:

FIG. 4 is a schematic diagram of a first manufacturing process for a touch panel. The manufacturing process includes forming a first conductive line 58 on a touch region 90 of a substrate 40; forming a plurality of lapping endpoints 64 on border of the touch region 90 of the substrate 40, wherein the lapping endpoints 64 are electrically connected with the inductive electrode layer 55. In the manufacturing process, the first conductive lines 58 and the lapping endpoints 64 can be produced respectively or synchronously according to different considerations of the design.

Figure 5:
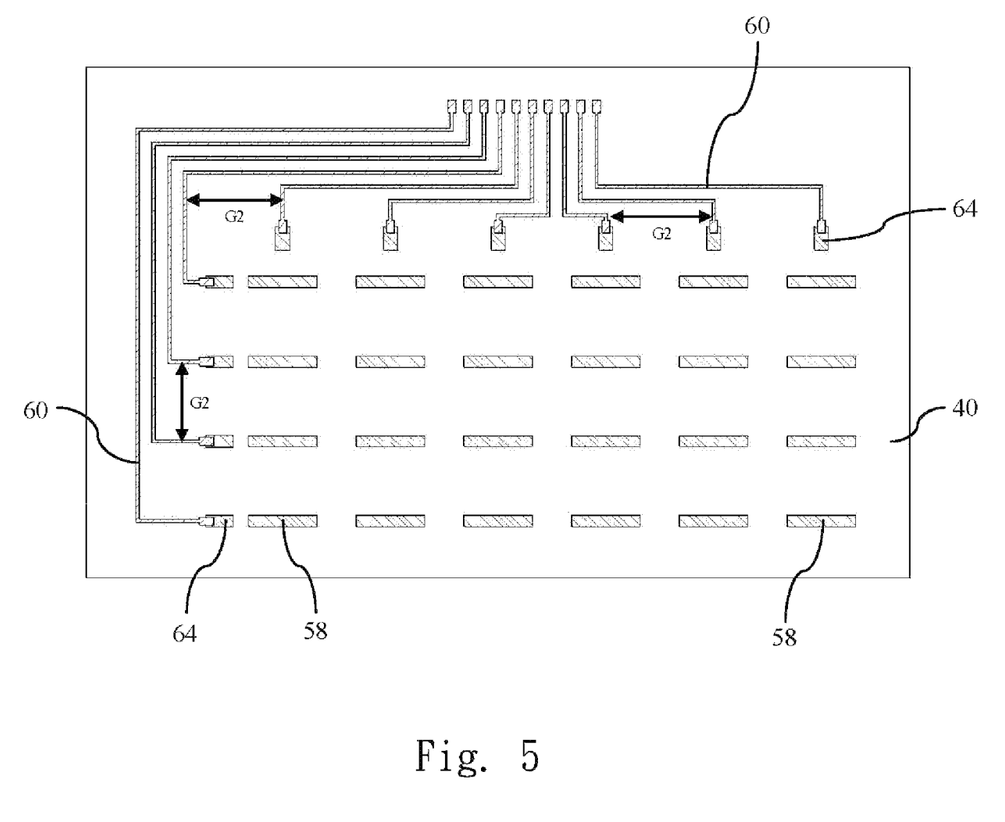
FIG. 5 is a schematic diagram of a second manufacturing process of a touch panel in accordance with the present disclosure.

FIG. 5 is a schematic diagram of a second manufacturing process for the touch panel in the present disclosure. Peripheral circuits 60 are formed on a peripheral region 80 of the substrate 40 so as to make the peripheral circuits 60 electrically connected with the lapping endpoints 64. As shown in FIG. 5, there is a gap G2 (i.e., the second gap) formed between the adjacent peripheral circuits 60.

The first conductive lines 58, the lapping endpoints 64, and the peripheral circuits 60 can be made of metallic or transparent conductive materials. The first manufacturing process and the second manufacturing process can be conducted respectively or synchronously.

Figure 6:
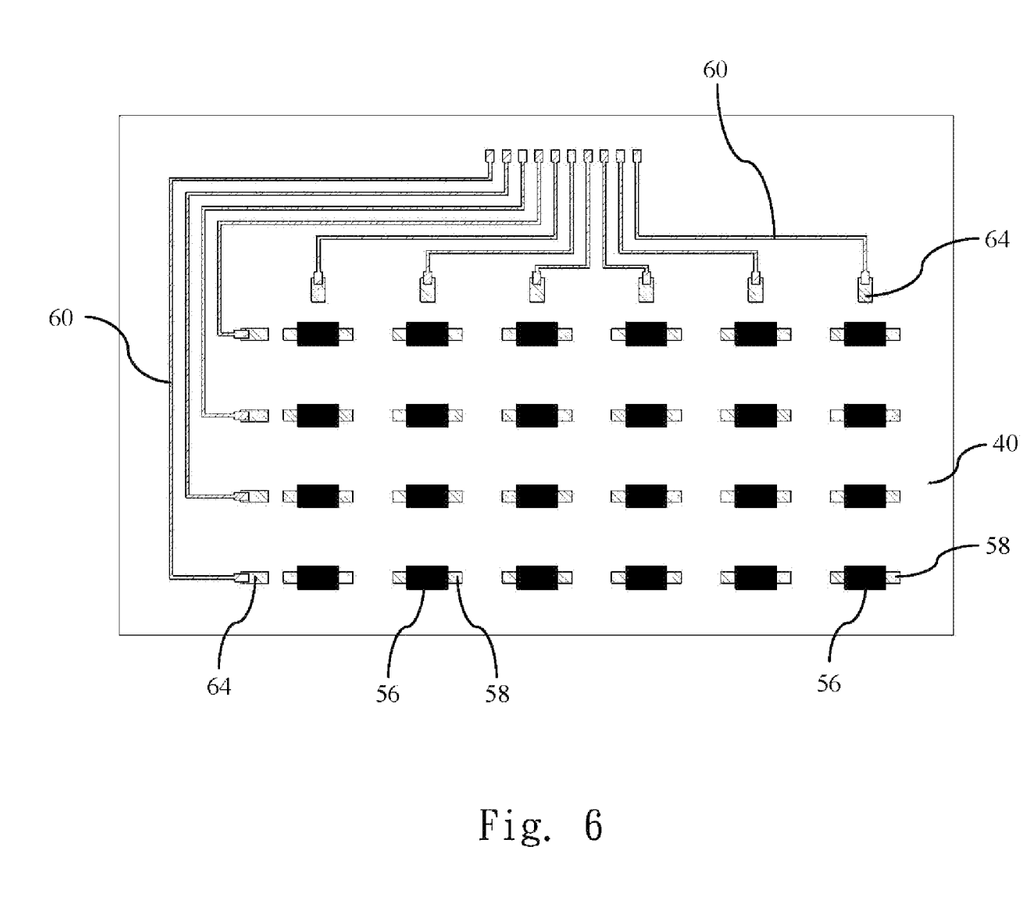
FIG. 6 is a schematic diagram of a third manufacturing process of a touch panel in accordance with the present disclosure.

FIG. 6 is a schematic diagram of a third manufacturing process for the touch panel in the present disclosure. Insulating blocks 56 are formed on the first conductive line 58 by using transparent insulating materials.

Figure 7:
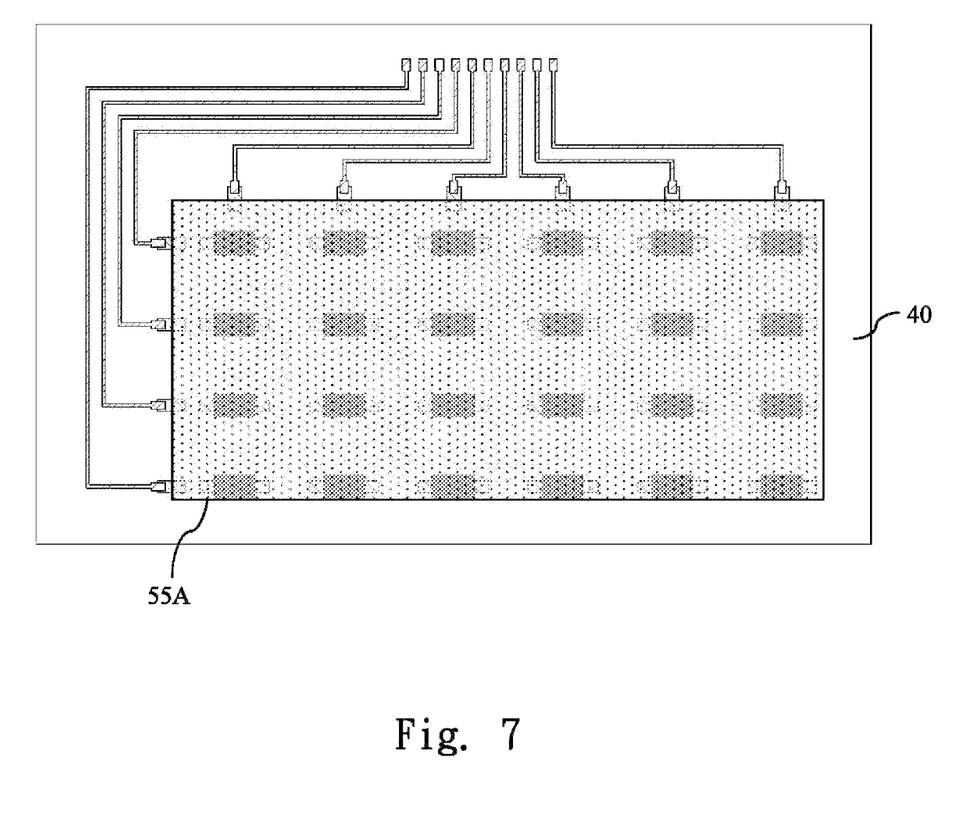
FIG. 7 is a schematic diagram of a fourth manufacturing process of a touch panel in accordance with the present disclosure.

FIG. 7 is a schematic diagram of a fourth manufacturing process for the touch panel in the present disclosure. An inductive layer 55A is coated on the touch region 90 of the substrate 40, i.e., a transparent conductive material can be coated on the first conductive lines 58 and the insulating blocks 56 to form the inductive layer 55A.

Figure 8:
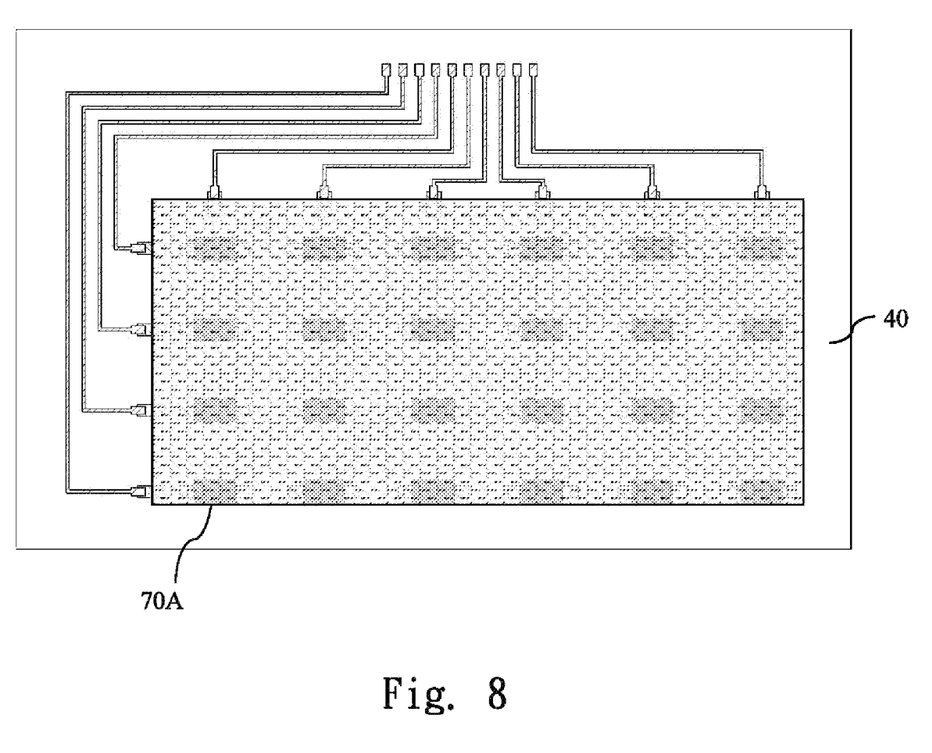
FIG. 8 is a schematic diagram of a fifth manufacturing process of a touch panel in accordance with the present disclosure.

FIG. 8 is a schematic diagram of a fifth manufacturing process for the touch panel in the present disclosure. A protective layer 70A is coated on the inductive layer 55A, i.e., a transparent insulating material can be coated on the inductive layer 55A to form the protective layer 70A.

After the fifth manufacturing process, the inductive layer 55A and the protective layer 70A can be patterned to form the inductive electrode layer 55 and the patterned protective layer 70 respectively (as the structure-completing drawing shown in FIG. 1A). Formative pattern of the patterned protective layer 70 is identical to that of the inductive electrode layer 55 including the first conductive units 54, the second conductive units 53, and the second conductive lines 51 so that the gap G1, as shown in FIG. 1B, is exposed from the protective layer 70. In some embodiments, the step of patterning the protective layer 70A and the inductive layer 55A can be conducted synchronously or respectively.

The step of patterning the inductive layer 55A to form the inductive electrode layer 55 further comprises: forming the first conductive units 54 along a first axis, wherein the first conductive units 54 are electrically connected to the first conductive line 58 of the first manufacturing process; forming the second conductive units 53 along a second axis, wherein the second conductive line 51 is linked to the second conductive units 53. The first conductive units 54 and the second conductive units 53 are mutually and electrically insulated, for instance, by setting the insulating blocks 56 between the first conductive line 58 and the second conductive line 51, thereby making the first conductive units 54 and the second conductive units 53 mutually and electrically insulated from each other. After finishing this step, the structure within the touch region 90 can be formed as shown in FIG. 2A.

The protective layer 70A is coated on the peripheral circuits 60 while being coated on the inductive layer 55A in the fifth manufacturing process. In the step of patterning the protective layer 70A, the patterned protective layer 70 is formed on the corresponding peripheral circuit 60 at the same time so that the patterned protective layer 70 covers the peripheral circuits 60 and is identical to the peripheral circuits 60 in the aspect of formative patterns, and the gap G2 between the adjacent peripheral circuits 60 is exposed from the protective layer 70, as shown in FIG. 1A.

The patterned protective layer 70 has same formative pattern as that of the first conductive unit 54, the second conductive unit 53, the second conductive line 51, and the peripheral circuit 60. The patterned protective layer 70 can also cover the first conductive line 58, the insulating block 56, and the lapping endpoints 64 exposed outside, thereby protecting the components from being subjected to the subsequent baking in high-temperature manufacturing process.

In the process of conducting high-temperature baking after finishing the patterning step, the first conductive unit 54, the second conductive unit 53, and the second conductive line 51 do not come in contact with oxygen due to the patterned protective layer 70 that covers the first conductive unit 54, the second conductive unit 53, and the second conductive line 51. Thus, the first conductive unit 54, the second conductive unit 53, and the second conductive line 51 have more favorable diamond resistance under the condition of high-temperature baking.

A touch panel and a manufacturing method thereof are provided in the present disclosure, wherein a protective layer is used for covering an inductive electrode layer in a subsequent baking process to isolate the inductive electrode layer from oxygen and overcome the influence of oxygen on diamond resistance changes of the inductive electrode layer under the condition of high-temperature baking, thereby enhancing the product yield and accuracy of touch positions recognized by touch panel.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel, comprising:
   an inductive electrode layer; and
   a protective layer covering the inductive electrode layer, wherein the inductive electrode layer and the protective layer are geometrically shaped in a manner that a pattern of the protective layer is identical to a pattern of the inductive electrode layer.

2. The touch panel of claim 1, further comprising:
   a substrate having a touch region and a peripheral region surrounding the touch region, wherein the inductive electrode layer is disposed on the touch region.

3. The touch panel of claim 2, further comprising:
   a plurality of lapping endpoints distributed on at least one edge of the touch region, wherein the lapping endpoints are electrically connected with the inductive electrode layer.

4. The touch panel of claim 3, further comprising:
   a plurality of peripheral circuits distributed on the peripheral region of the substrate and electrically connected with the lapping endpoints.

5. The touch panel of claim 4, wherein the protective layer comprises a first portion formed in the touch region and a second portion formed in the peripheral region, the inductive electrode layer and the first portion of the protective layer are geometrically shaped in a manner that a pattern of the first portion of the protective layer is identical to the pattern of the inductive electrode layer, and the peripheral circuits and the second portion of the protective layer are geometrically shaped in a manner that a pattern of the second portion of the protective layer is identical to a pattern of the peripheral circuits.

6. The touch panel of claim 4, wherein the peripheral circuits are made of metallic materials or transparent conductive materials, and wherein the protective layer is made of transparent insulating materials, and wherein the substrate is a transparent glass substrate or a plastic substrate.

7. The touch panel of claim 5, wherein the inductive electrode layer comprises:
   a plurality of first conductive units distributed along a first axis and a plurality of first conductive lines, wherein adjacent first conductive units are electrically connected with a corresponding first conductive line of the plurality of first conductive lines; and
   a plurality of second conductive units distributed along a second axis and a plurality of second conductive lines connected with the second conductive units,
   wherein the first conductive units and the second conductive units are mutually and electrically insulated, and a gap is formed between an adjacent first conductive unit and the second conductive unit, and
   wherein the first conductive units and the second conductive units each comprise a surface covered by the first portion of the protective layer, and the gap is exposed from the first portion of the protective layer.

8. The touch panel of claim 7, further comprising:
   an insulating block set between the first conductive lines and the second conductive lines, wherein insulating blocks of the insulating block set are made of transparent insulating materials.

9. The touch panel of claim 7, wherein the first conductive units, the second conductive units, and the second conductive lines are made of transparent conductive materials, and wherein the first conductive lines are made of metals, or wherein the first conductive units, the second conductive units, the first conductive lines, and the second conductive lines are made of transparent conductive materials.

10. The touch panel of claim 5, wherein the peripheral circuits comprise a plurality of strip structures, and a gap is formed between adjacent strip structures; and wherein the strip structures are covered by the second portion of the protective layer, and the gap is exposed from the second portion of the protective layer.

11. A manufacturing method for a touch panel, comprising:
    baking an inductive electrode layer and protective layer covering the inductive electrode layer, wherein the inductive electrode layer and the protective layer are geometrically shaped in a manner that a pattern of the protective layer is identical to a pattern of the inductive electrode layer.

12. The manufacturing method of claim 11, wherein the inductive electrode layer and the protective layer are baked concurrently.

13. The manufacturing method of claim 11, wherein, prior to baking the inductive electrode layer and the protective layer, the method further comprises:
    coating an inductive layer on a touch region of a substrate;
    coating the protective layer on the inductive layer;
    patterning the protective layer to form the pattern of the protective layer; and
    patterning the inductive layer to form the pattern of the inductive electrode layer.

14. The manufacturing method of claim 13, wherein patterning the protective layer and patterning the inductive layer are conducted synchronously.

15. The manufacturing method of claim 13, wherein, prior to coating the inductive layer on the touch region of the substrate, the method further comprises:
    forming a plurality of first conductive lines;
    forming a plurality of lapping endpoints at an edge of the touch region of the substrate; and
    forming a plurality of peripheral circuits on a peripheral region of the substrate,
    wherein the peripheral circuits are electrically connected with the lapping endpoints, and wherein the lapping endpoints are electrically connected with the inductive electrode layer.

16. The manufacturing method of claim 15, wherein the first conductive lines, the lapping endpoints, and the peripheral circuits are made of metallic or transparent conductive materials synchronously.

17. The manufacturing method of claim 15, wherein the patterning the inductive layer to form the pattern of the inductive electrode layer further comprises:
    forming a plurality of first conductive units along a first axis, wherein adjacent first conductive units are electrically connected with a corresponding first conductive line of the plurality of first conductive lines; and
    forming a plurality of second conductive units along a second axis and a plurality of second conductive lines connected with the second conductive units,
    wherein the first conductive units and the second conductive units are mutually and electrically insulated.

18. The manufacturing method of claim 17, wherein the first conductive units and the second conductive units are mutually and electrically insulated by setting an insulating block between the corresponding first conductive line and a corresponding second conductive line of the plurality of first conductive lines.

19. The manufacturing method of claim 15, wherein a portion of the protective layer covers the peripheral circuits and the portion of the protective layer has an identical pattern to the peripheral circuits.

* * * * *